(12) United States Patent
Dube et al.

(10) Patent No.: US 8,654,965 B2
(45) Date of Patent: *Feb. 18, 2014

(54) METHOD AND STRUCTURE FOR AUTOMATED CREDITING TO CUSTOMERS FOR WAITING

(75) Inventors: Parijat Dube, Yorktown Heights, NY (US); Giuseppe A. Paleologo, Riverdale, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,518

(22) Filed: Aug. 27, 2012

(65) Prior Publication Data
US 2012/0323646 A1 Dec. 20, 2012

Related U.S. Application Data

(63) Continuation of application No. 11/492,043, filed on Jul. 25, 2006, now Pat. No. 8,284,924.

(51) Int. Cl.
*H04M 3/00* (2006.01)
(52) U.S. Cl.
USPC .................................... 379/266.01; 705/14.1
(58) Field of Classification Search
USPC ................. 379/215.01, 309, 265.01, 265.02, 379/266.01, 266.02, 266.03, 266.06, 379/266.08; 705/14.1, 14.11, 14.12, 14.13, 705/14.14

See application file for complete search history.

(56) References Cited

U.S. PATENT DOCUMENTS

| 6,820,260 | B1 | 11/2004 | Flockhart et al. |
| 8,284,924 | B2 * | 10/2012 | Dube et al. ............... 379/266.01 |
| 2002/0067823 | A1 | 6/2002 | Walker et al. |
| 2003/0108162 | A1 | 6/2003 | Brown et al. |
| 2005/0047576 | A1 | 3/2005 | Hidesawa et al. |
| 2005/0097034 | A1 | 5/2005 | Loeger et al. |
| 2005/0278215 | A1 | 12/2005 | Seele, Jr. |

OTHER PUBLICATIONS

United States Office Action dated Mar. 17, 2010 in U.S. Appl. No. 11/492,043.
United States Office Action dated Sep. 10, 2010 in U.S. Appl. No. 11/492,043.
United States Office Action dated Mar. 2, 2011 in U.S. Appl. No. 11/492,043.
United States Office Action dated Jan. 4, 2012 in U.S. Appl. No. 11/492,043.

* cited by examiner

*Primary Examiner* — Antim Shah
(74) *Attorney, Agent, or Firm* — Daniel P. Morris; McGinn IP Law Group, PLLC (57) ABSTRACT

A method and structure for reducing customer dissatisfaction for waiting includes a queue monitoring subsystem which detects an entry of a customer into a waiting queue. A reward computing subsystem calculates a reward for the customer for being in the waiting queue, and a communication subsystem communicates the reward to the customer. At least one of subsystems is automated.

19 Claims, 6 Drawing Sheets

METHOD AND STRUCTURE FOR AUTOMATED CREDITING TO CUSTOMERS FOR WAITING

This application is a Continuation Application of U.S. patent application Ser. No. 11/492,043, having filing date of Jul. 25, 2006 now U.S. Pat. No. 8,284,924.

BACKGROUND OF THE INVENTION

1. Field of the Invention

The present invention generally relates to a mechanism for increasing customer satisfaction among users of any time-shared resources, such as contact centers or recreational, restaurant or lodging facilities, while reducing the likelihood that the customer will leave the system while waiting for service. More specifically, a system provides awards/rewards to a customer based on the waiting time, with at least one step in the process being automated.

2. Description of the Related Art

Many customers experience some "dis-utility" for waiting for service in a call center, and consequently balk from the system and/or do not call again, resulting in loss of goodwill and monetary losses. This is of particular importance when a call center handles sales, up-sell and cross-sell functions.

Figure 1:
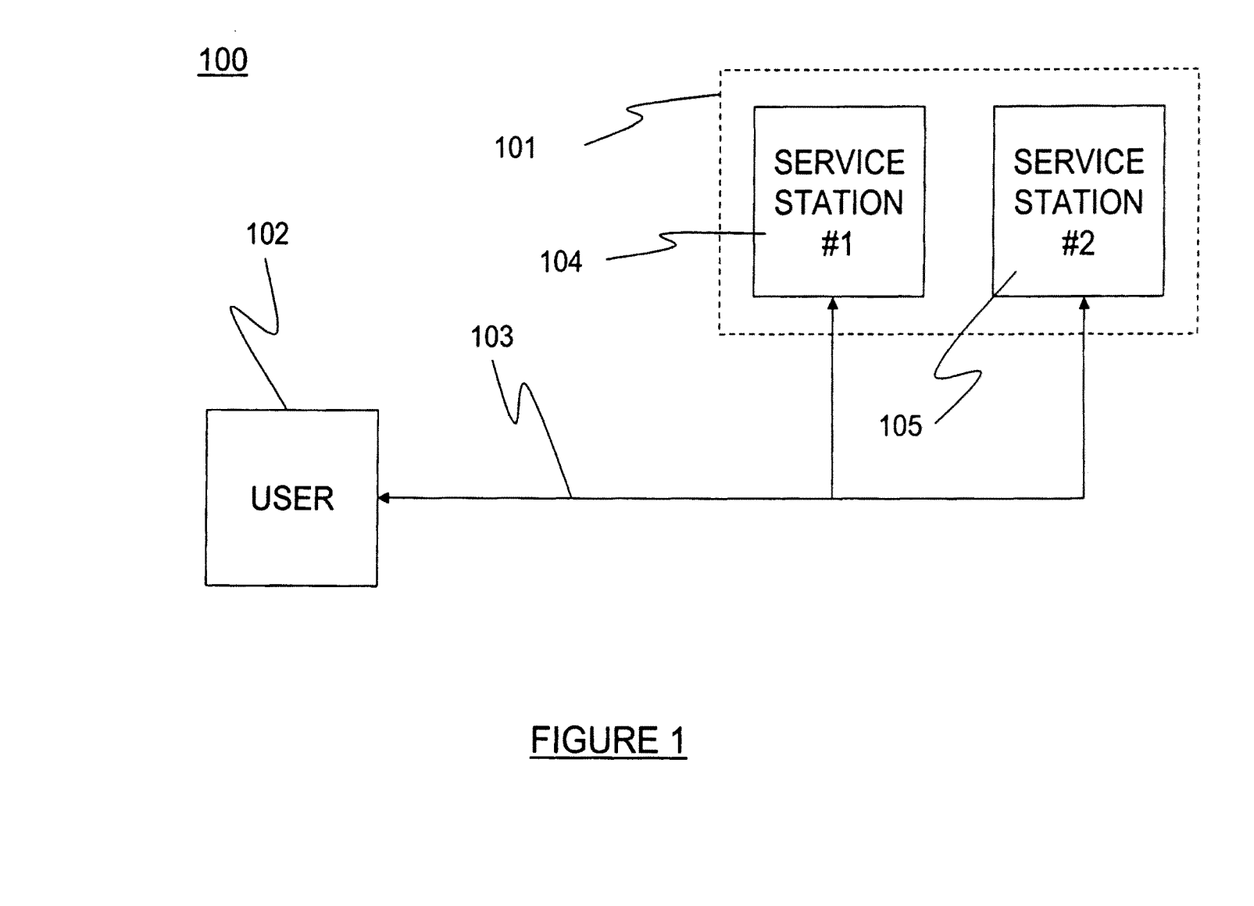
FIG. 1 shows exemplarily the customer waiting time problem in a time-shared resource environment 100.

FIG. 1 exemplarily shows a typical time-shared resource environment 100, such as a contact center 101, wherein customer 102 interacts in some manner 103 with a service (e.g., using a telephone system). Contact center 101 exemplarily has two service representatives 104,105 currently on duty. It is common to experience dissatisfaction upon being placed on hold when all available service representatives are busy serving other customers. Similarly, it is common to experience dissatisfaction when forced to wait at a recreational, restaurant or lodging facility.

Thus, a need exists to reduce customer dissatisfaction during times of awaiting service, particularly in those environments where the service is discretionary to the customer, in the sense that the customer has alternatives to waiting for such service, either by going elsewhere or by substitution of the service by another service.

One obvious remedy to this problem is to reduce the waiting time by increasing the available resources. However, given the expense of increasing human labor resources, it may be more economical to offer incentives to the customer to wait rather than to increase the resources to handle customers more quickly.

SUMMARY OF THE INVENTION

In view of the foregoing, and other, exemplary problems, drawbacks, and disadvantages of the conventional systems, it is an exemplary feature of the present invention to provide a structure (and method) in which customer satisfaction is increased among users of contact centers or any time-shared resource situation, such as recreational facilities, restaurants or lodging facilities or numerous other time-shared resources, while reducing the likelihood that such users will leave the system while waiting for service.

Another exemplary feature of the present invention is to provide a method that can be implemented as an adjunct to existing marketing or customer inducement strategies in almost any environment when a waiting period for service is possible or likely.

To achieve such features, in a first exemplary aspect of the present invention, disclosed herein is a system for reducing customer dissatisfaction for waiting, including a queue monitoring subsystem that detects an entry of a customer into a waiting queue, a reward computing subsystem that calculates a reward for the customer for being in the waiting queue, and a communication subsystem to communicate the reward to the customer, wherein at least one of the queue monitoring subsystem, the reward computing subsystem, and the communication subsystem is automated.

In a second exemplary aspect of the present invention, disclosed herein is a method for reducing customer dissatisfaction for waiting, including detecting an entry of a customer into a waiting queue, calculating a reward for the customer for being in the waiting queue, and communicating the reward to the customer, wherein at least one of the detecting, calculating, and communicating is automated.

In a third exemplary aspect of the present invention, disclosed herein is a signal-bearing medium tangibly embodying a program of machine-readable instructions executable by a digital processing apparatus to perform at least one of said detecting, said calculating, and said communicating for this method of reducing customer dissatisfaction.

Thus, the present invention provides a mechanism to inherently add value to almost any service-oriented scenario for which there is a potential customer waiting period and attendant customer dissatisfaction.

BRIEF DESCRIPTION OF THE DRAWINGS

The foregoing and other purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Referring now to the drawings, and more particularly to FIGS. 2-7, there are shown exemplary embodiments of the method and structures according to the present invention.

Figure 2:
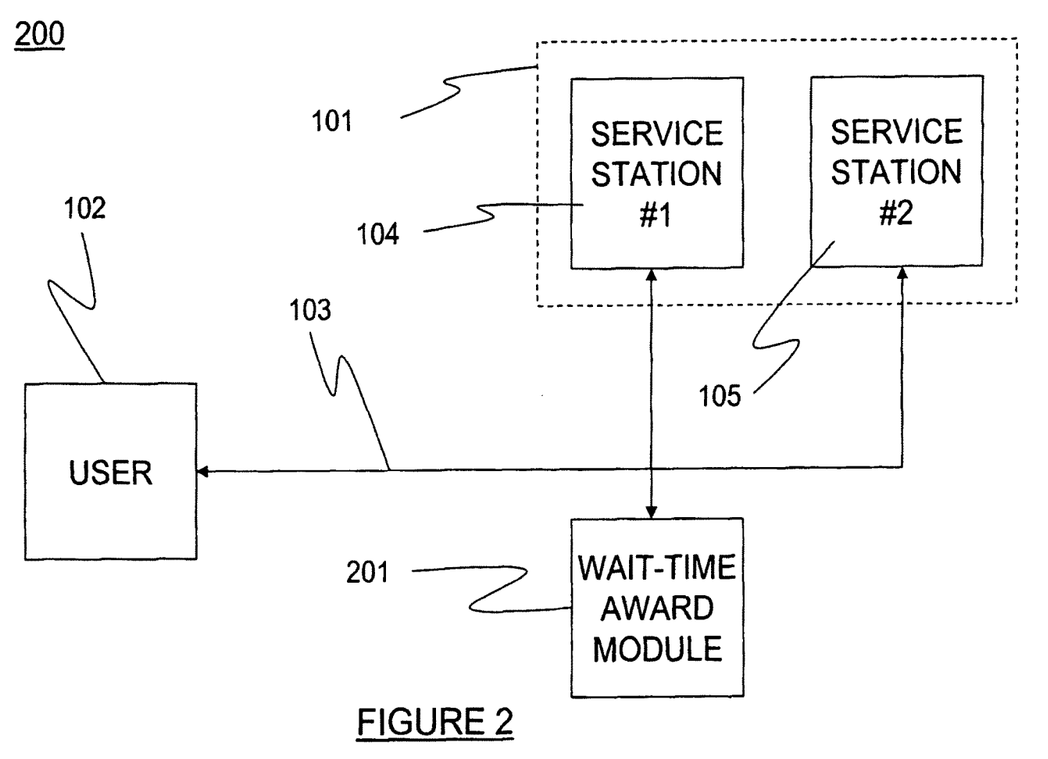
FIG. 2 shows an exemplary embodiment 200 of the present invention having a large degree of automation.

FIG. 2 shows one exemplary embodiment 200 of the present invention as modifying the time-shared resource environment shown in FIG. 1 to introduce a wait-time award module 201 in a manner so that waiting time experienced by customer 102 can be detected and, in a preferred embodiment, the customer is awarded a reward as based on duration of the wait time. In other environments, such as one that strives to provide no waiting for service, it might be more practical to make the award simply upon entry into a waiting queue.

Depending upon the specific environment in which the invention is used, examples of possible rewards might be such things as discounts or price waivers on certain products, extensions on warranty contracts, rebates, and special offers of exclusive products. A particularly interesting form of reward strategy is based on a "points" system, as in frequent flyer miles or frequent shopper credits.

Figure 3:
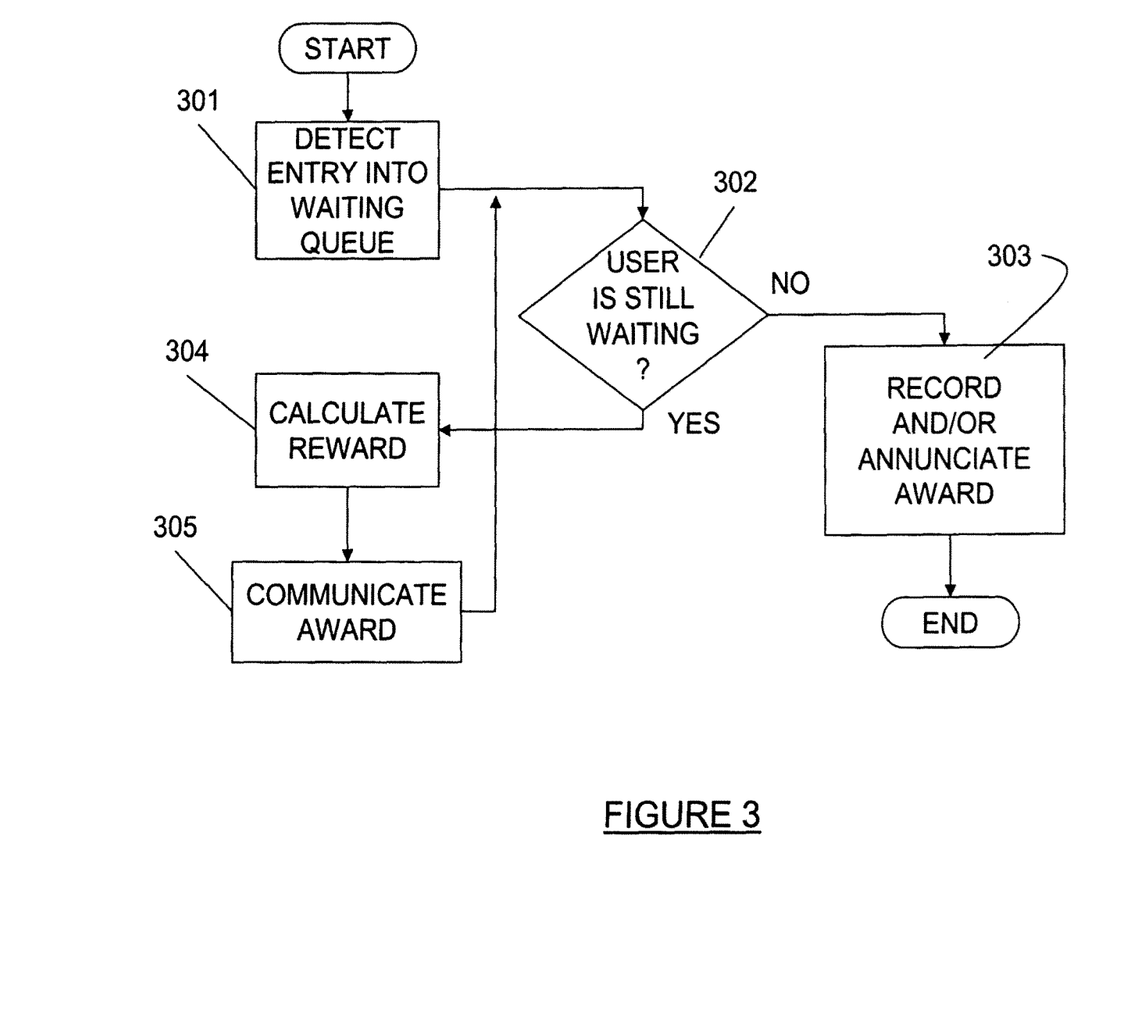
FIG. 3 shows exemplarily a basic flowchart 300 of subsystems used to implement the present invention.

The flowchart 300 of FIG. 3 shows the basic flow of events in an embodiment in which the award continues to build up as long as the wait period continues. In step 301, the entry of the user is detected. In the telephone contact center environment shown in FIG. 2, this queue entry detection could be achieved by using the same mechanism commonly in use to place a user on hold when all customer service representatives are busy. In a recreational, restaurant or lodging facility, entry into the queue is noted by an agent who may be physically present. Since the waiting award strategy is based upon duration of the waiting time in this embodiment, the queue entry time is detected.

In some embodiments, such as those in which the award system is cumulative or added to an existing credit or account, the date of the wait might also be detected, as well as a user identification number.

Periodically, in step 302, it is determined whether the user is still waiting. If not, then the user has left the queue, so that the session is finalized in step 303 by, for example, recording the award due to the user's account and/or announcing or otherwise communicating the award amount to the user, and the session ends.

If the user is still in the queue, in step 304, then the award is updated as appropriate for the longer period of waiting time. In step 305, the updated award amount is communicated to the user, and the loop then returns to step 302 to check again for additional wait time.

It is noted that, although this scenario describes an end to the session, it is possible that multiple waiting periods be involved in a single session. Thus, a first waiting period might be interrupted by an initiation of service, only to have a second waiting period because the user is again placed in a wait mode due, perhaps to the service provider having to divert attention for another task or to pursue an activity related to the service that inherently requires the user to again wait.

During such repeated waiting periods, it should be clear that user satisfaction would be increased if the user is more or less immediately made aware that the award system has been reinstated so that the additional waiting period is also subject to an award.

Figure 4:
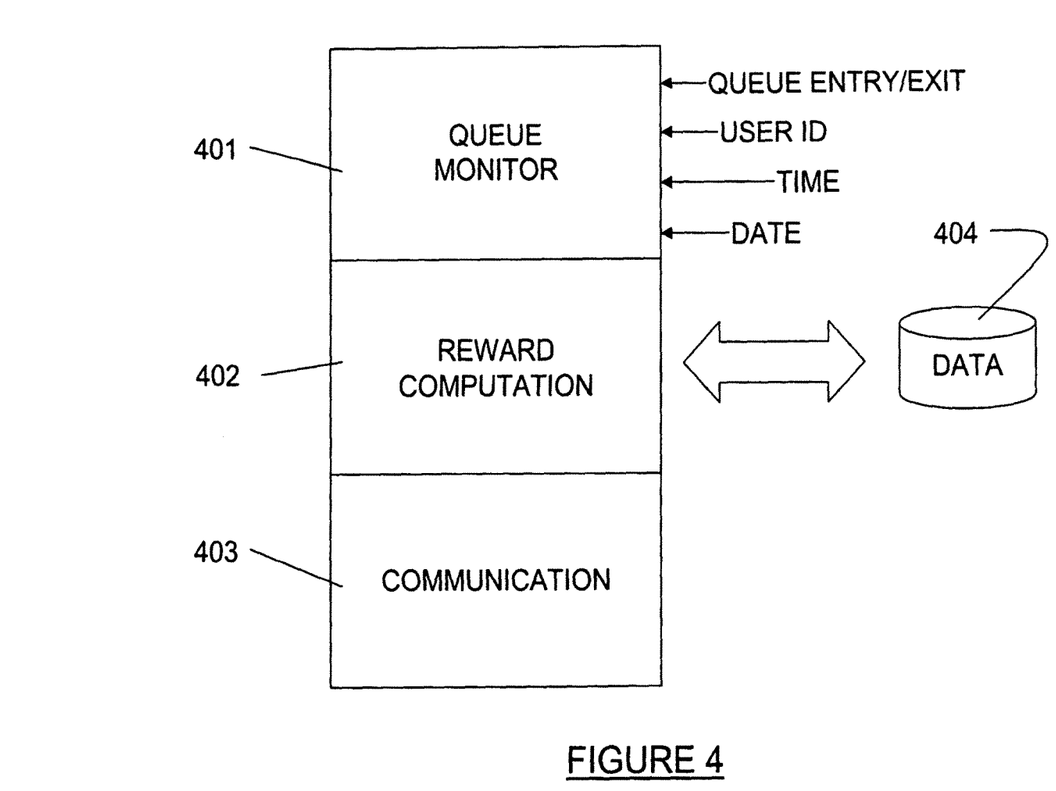
FIG. 4 shows exemplarily a block diagram 400 of the method to implement the present invention.

The block diagram 400 of FIG. 4 shows the flowchart 300 as embodied in a fully-automated, software-implemented system having three primary subsystems: a queue monitoring subsystem 401, a reward computing subsystem 402, and a communication subsystem 403.

Queue monitoring module 401 detects the user entering and leaving the waiting queue, as well as application-specific parameters such as the user identification, time of entry, and date of entry. Reward computation module 402 receives inputs from the queue monitoring module 401 to calculate/update the session award, and communication module 403 announces the award to the user, perhaps keeping the user updated periodically as the waiting session continues. There also may be an interface with a database 404 to maintain user account information, including cumulative awards/credits.

Exemplary Hardware Implementation

Figures 5, 6:
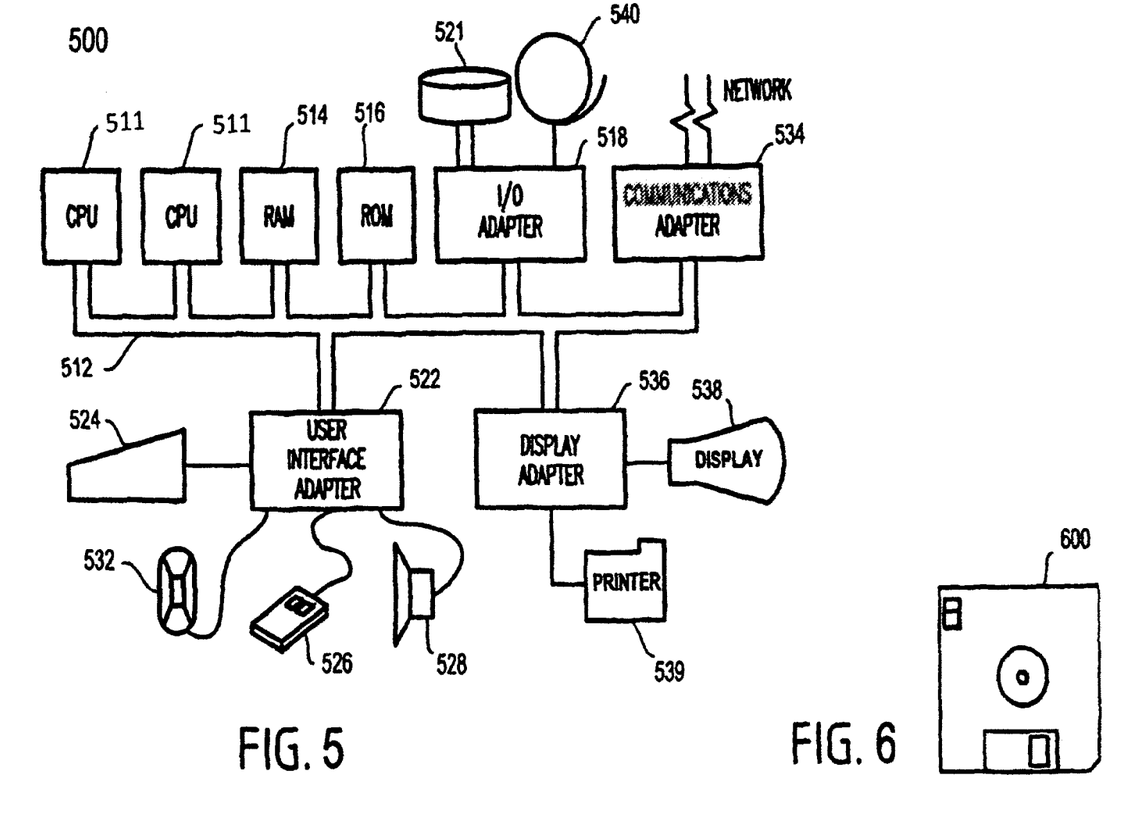
FIG. 5 illustrates an exemplary hardware/information handling system 500 for incorporating the present invention therein.
FIG. 6 illustrates a signal bearing medium 600 (e.g., storage medium) for storing steps of a program of a method according to the present invention.

FIG. 5 illustrates a typical hardware configuration of an information handling/computer system in accordance with a fully automated embodiment of the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Non-Fully Automated Exemplary Implementations

It is noted that, although the concepts of the present invention are exemplarily discussed above as having been implemented as an automated system on a computer, as might be appropriate in a telephone- or internet-based contact center, and wherein at least one or more steps in the process is automated, such computer implementation and automation is clearly not necessary. That is, in other environments, a completely computerized system may not be present or desired, since it might be advantageous to implement the method in a less automated manner, and it is easy to configure the present invention in a manner and in a scenario in which no step in the process discussed above involves automation.

The term "automated", in the context of the present invention, means that a device, such as a computer, electronic circuit, or even a simple mechanical clocking device, performs calculations or at least one phase of a step of the process, although a human input might be used to initiate and/or terminate the automated phase. Thus, for example, a restaurant implementing the present invention for waiting customers might incorporate a timing device into the alerting device oftentimes given to waiting customers to provide a flashing light, vibration, and/or audible alert to return to the hostess for seating. Alternatively, if the arrival time of the customer is noted in a computer, then the computer is able to track the waiting time of the customer without requiring a device to be held by the customer.

Figure 7:
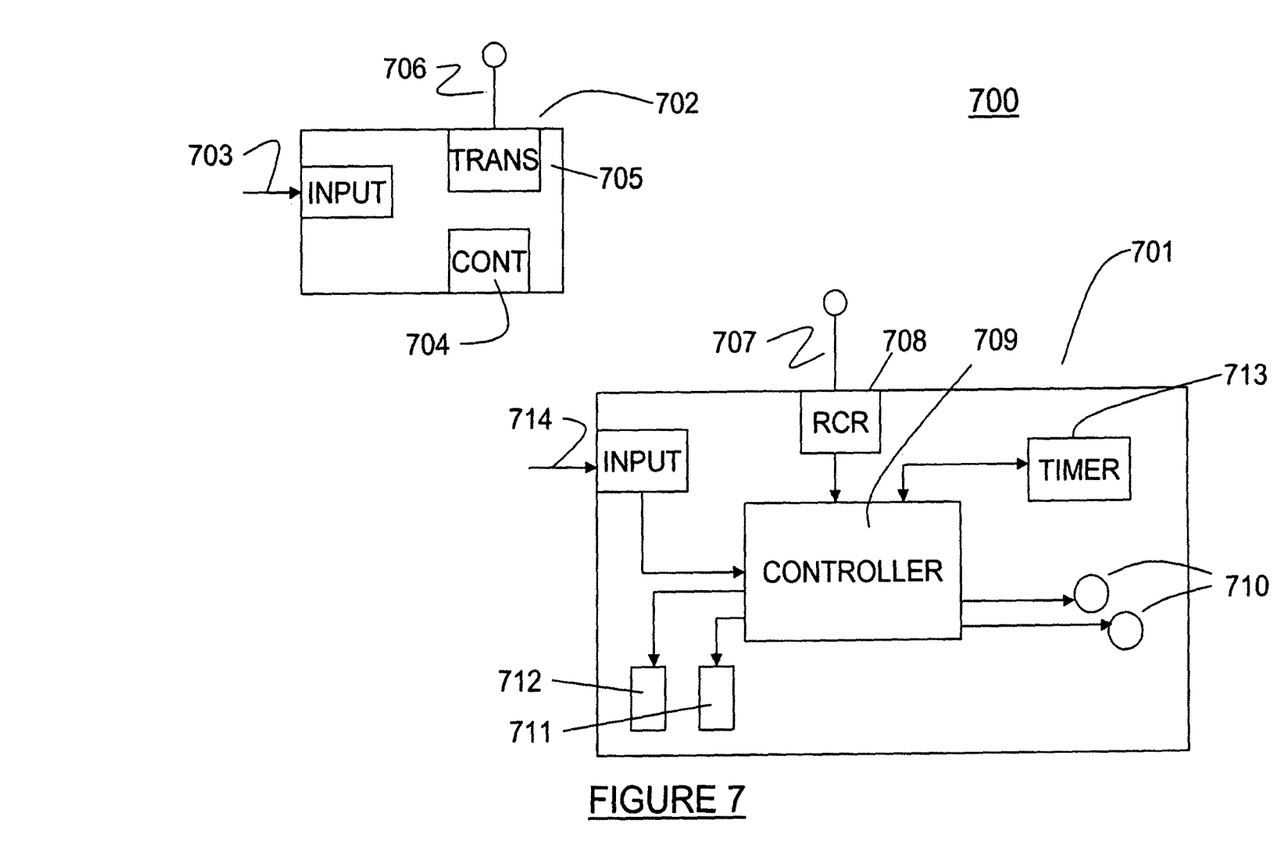
FIG. 7 illustrates a block diagram 700 of a conventional restaurant customer annunciation system as modified to incorporate concepts of the present invention.

FIG. 7 exemplarily shows a block diagram 700 of such an embodiment of the present invention as incorporated into an existing wait period system as might be used to alert a customer in a restaurant that her table is ready. In such a system, an announcer module 701 is given to the customer so that she can wait in the general area until called. Announcer module 701 is controlled from the hostess station 702. When the hostess provides an input 703 to alert the customer, this input 703 is received by the controller 704 which controls an appropriate signal to be transmitted by transmitter 705 through antenna 706.

In the announcer module 701, antenna 707 and receiver circuit 708 receive the signal transmitted from hostess station 702 and provide it to the controller 709, which in turn activates one or more lights 710, speakers 711, and/or vibrators 712.

Incorporation of the present invention would add a timer 713 for measuring the waiting period. Although the timer is exemplarily shown as added to each announcer module 701, it could also be added as a single timer in the hostess station 702. Announcer module 701 could be easily adapted to provide automatic annunciation of the waiting reward, if desired, and the calculation of the reward could be done in either the announcer module 701 or the hostess station 702.

In this application it might also be advantageous to start the waiting period after a predetermined period. For example, if the agent or hostess tells the customer that there is an expected ten-minute wait before being seated, the waiting period to be rewarded could be initiated immediately or after that initial ten-minute wait. In this scenario, therefore, the present invention could function to provide a reward simply upon entry into the waiting queue.

Another possible variation might be a weighting of the rewards provided, thereby affecting the calculation of the reward. That is, some customers might have a special status or preference that the service provider wishes to reward differently from other customers.

In either of these variations, input capability 703, 714 into either the hostess station 702 or announcer module 701 could be provided for such special inputs into the calculation of the reward or the redefinition of the waiting period initiation.

It should also be clear that the concepts of the present invention could be implemented completely devoid of computerization or automation of any kind. For example, this may be the case in the restaurant scenario. Upon arrival, the customer checks in with the host or hostess or other attendant, who jots down the customer's arrival time on a document such as a restaurant waiting list or, perhaps, the order form that will be used by the waiter to take the customer's order. This arrival time signifies the customer's entry into the service queue.

When the host or hostess seats customer, the hostess notes the seating time on the order form, thereby signifying the end of the first waiting period, calculates the appropriate award for that waiting period and announces the award to the customer. A second waiting period might be initiated for the time required to prepare the ordered items, to be terminated as the items are served.

It should be clear that all elements of the flowchart 300 have been demonstrated in this simplistic non-automated implementation. This example also demonstrates the potentially multiple waiting periods for the customer, either by having a cumulative waiting period award for separate visits to the service queue or by having more than one possible waiting period for a single visit.

The cumulative award for more than one visit is straightforward, given a memory mechanism to maintain the customer's current award amount. In the non-automated method of the restaurant, this cumulative total could be "stored in a memory" by a method such as providing the customer with an indication on the receipt that would subsequently be presented for satisfaction of the cumulative award. Similarly, the automation of this invention in such an example may be in the memory step, in which successive visits' wait times are stored, and rewards are allocated accordingly, or by maintaining other customer information in a computerized medium, which may be used in determining the reward to be offered to the customer.

The potential for multiple waiting periods in a single visit or session can be demonstrated in the restaurant situation by, for example, starting a second waiting period once the customer has been seated and placed an order, thereby waiting in a second service queue to be terminated upon delivery of the order.

It should be clear that the method of the present invention, with a bit of consideration to characteristics of its specific application and environment, could be used as a marketing tool, given some creativity on the nature of the application, the customer, and the potential awards.

It should also be clear that there are many possible variations, including non-limiting examples as follows.

The method can be easily implemented in almost any service queue environment and in any degree of automation from completely automated to completely non-automated.

The system could implement multiple waiting periods, such as cumulative periods due to multiple visits and/or multiple waiting periods within a single visit.

The rewards could be based simply upon the customer as having entered into the waiting queue, due to, for example, a policy that the service is intended as being available with no waiting period. More practically, the rewards would be based upon the amount of time that the customer spends waiting for service.

The customer could be periodically updated with information about his or her reward or other characteristics about the customer. This periodic announcement can be a key feature in the aspect of the present invention to increase satisfaction for waiting customers.

The system could be offered only to certain customers, perhaps based upon meeting one or more particular characteristics.

The system could be used in conjunction with other marketing methods to attract new or repeat customers.

The system could have rewards based on points, similar to frequent flyer miles or credits from other pre-existing programs that the customer already holds.

The system could have rewards as being certain products, extensions on warranty contracts, rebates, or special offers of exclusive products.

The system could be used in any number of diverse applications, such as a call center or contact center, an automated reservation system, a restaurant, or sports or entertainment facility.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A system for reducing customer dissatisfaction for waiting for service in a queue, said system comprising:

a queue monitoring subsystem that detects an entry of a customer into a waiting queue for one of a call center and a contact center, as executed by a processor on a computer;

a reward computing subsystem that calculates a reward for the customer for being in the waiting queue; and a communication subsystem to communicate the reward to the customer, wherein the queue monitoring subsystem:

detects an entry time of the customer into the waiting queue as a start time of a session; and periodically, after each of a predetermined period of time, determines whether the customer is still remaining in the waiting queue and accordingly notifies the reward computing subsystem, wherein the reward computing subsystem, upon receiving the notification from the queue monitoring subsystem, calculates an updated reward each time the customer is determined to still remain in the waiting queue and notifies the communication subsystem to communicate the updated reward to the customer, and wherein, the reward computing subsystem is configured such that, when the customer's waiting includes multiple waiting periods within a single waiting session, the calculated updated reward is cumulative over the entire waiting session meaning that during the single waiting session, when a first waiting period portion is interrupted by an initiation of service, only to have a second waiting period portion because the customer is again placed in the waiting queue by one of the call center or the contact center, the first and second waiting period portions are considered as cumulative for the reward calculation.

2. The system of claim 1, wherein the reward is selectively offered to certain customers who satisfy particular characteristics.

3. The system of claim 1, wherein the reward comprises a credit to the customer.

4. The system of claim 1, wherein the reward is based on a system of points or credits from other pre-existing programs that the customer already holds.

5. The system of claim 1, wherein the reward comprises one or more of:

certain products;
extensions on warranty contracts;
rebates; and
special offers of exclusive products.

6. The system of claim 1, wherein the reward is cumulative and periodically increases as the waiting time passes.

7. The system of claim 6, wherein the reward is cumulative over multiple waiting periods, said method further comprising determining a date each time a customer enters into the queue.

8. The system of claim 1, wherein the customer is advised, upon entry into the waiting queue, of an expected waiting time and the reward calculation begins upon an expiration of the expected waiting time, the customer thereafter being kept periodically advised of the current status of the reward.

9. The system of claim 1, wherein an effort is made to provide no waiting for service, so that an initial reward is announced to the customer upon entry into the waiting queue.

10. The system of claim 1, wherein the customer's reward is added to a stored cumulative amount that maintains the customer's cumulative reward amount over a plurality of visits, thereby also encouraging the customer to return for future service.

11. The system of claim 1, wherein, if the queue monitoring subsystem determines the customer is no longer in the waiting queue, the queue monitoring subsystem ends the session and records the reward for the customer into a database.

12. The system of claim 1, wherein the reward is selectively calculated using weighting so that certain customers can have a special status or preference.

13. A method for reducing customer dissatisfaction for waiting for service, said method comprising:

detecting an entry of a customer into a waiting queue in one of a call center and a contact center, using a processor on a computer;

calculating a reward for the customer for being in the waiting queue; and periodically communicating the reward to the customer, wherein:

the detecting detects an entry time of the customer into the waiting queue as a start time of a session; and periodically, after each of a predetermined period of time, determines whether the customer is still remaining in the waiting queue and accordingly notifies to a reward computing subsystem, wherein the reward computing subsystem, upon receiving a notification from a queue monitoring subsystem, calculates an updated reward each time the customer is determined to still remain in the waiting queue and notifies a communication subsystem to communicate the updated reward to the customer, and wherein, the reward computing subsystem is configured such that, when the customer's waiting includes multiple waiting periods within a single waiting session, the calculated updated reward is cumulative over the entire waiting session meaning that during the single waiting session, when a first waiting period portion is interrupted by an initiation of service, only to have a second waiting period portion because the customer is again placed in the waiting queue by one of the call center or the contact center, the first and second waiting period portions are considered as cumulative for the reward calculation.

14. The method of claim 13, further comprising selectively offering the reward to certain customers who satisfy particular characteristics.

15. The method of claim 13, wherein the reward comprises a credit to the customer.

16. The method of claim 13, wherein the reward is based on a system of points or credits from other pre-existing programs that the customer already holds.

17. The method of claim 13, wherein the reward comprises one or more of:

certain products;
extensions on warranty contracts;
rebates; and
special offers of exclusive products.

18. The method of claim 13, wherein the reward is cumulative and periodically increases as the waiting time passes.

19. A non-transitory signal-bearing storage medium tangibly embodying a program of machine-readable instructions executable by a digital processing apparatus to perform a method of reducing customer dissatisfaction for waiting, said method comprising:

detecting an entry of a customer into a waiting queue in one of a call center and a contact center;

periodically calculating an updated reward for the customer for being in the waiting queue; and communicating the reward to the customer whenever it is periodically updated, wherein:

the detecting detects an entry time of the customer into the waiting queue as a start time of a session; and periodically, after each of a predetermined period of time, determines whether the customer is still remaining in the waiting queue and accordingly notifies to a reward computing subsystem, wherein the reward computing subsystem, upon receiving a notification from a queue monitoring subsystem, calculates an updated reward each time the customer is determined to still remain in the waiting queue and notifies a communication subsystem to communicate the updated reward to the customer, and wherein, the reward computing subsystem is configured such that, when the customer's waiting includes multiple waiting periods within a single waiting session, the calculated updated reward is cumulative over the entire waiting session meaning that during the single waiting session, when a first waiting period portion is interrupted by an initiation of service, only to have a second waiting period portion because the customer is again placed in the waiting queue by one of the call center or the contact center, the first and second waiting period portions are considered as cumulative for the reward calculation.

* * * * *